United States Patent
Bright-Thomas

(10) Patent No.: US 10,218,992 B2
(45) Date of Patent: Feb. 26, 2019

(54) ENCODING, TRANSMISSION AND DECODING OF COMBINED HIGH MOTION AND HIGH FIDELITY CONTENT

(71) Applicant: Cisco Technology, Inc., San Jose, CA (US)

(72) Inventor: Paul Bright-Thomas, Wokingham (GB)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 15/658,267

(22) Filed: Jul. 24, 2017

(65) Prior Publication Data

US 2019/0028726 A1    Jan. 24, 2019

(51) Int. Cl.

| | |
|---|---|
| *H04N 19/176* | (2014.01) |
| *H04N 19/44* | (2014.01) |
| *H04N 19/137* | (2014.01) |
| *H04N 19/172* | (2014.01) |
| *H04N 19/132* | (2014.01) |
| *H04N 19/583* | (2014.01) |

(52) U.S. Cl.
CPC ........... *H04N 19/44* (2014.11); *H04N 19/132* (2014.11); *H04N 19/137* (2014.11); *H04N 19/172* (2014.11); *H04N 19/176* (2014.11); *H04N 19/583* (2014.11)

(58) Field of Classification Search
CPC .... H04N 19/44; H04N 191/32; H04N 19/137; H04N 19/172; H04N 19/176; H04N 19/583

See application file for complete search history.

(56) References Cited

U.S. PATENT DOCUMENTS

| | | | | |
|---|---|---|---|---|
| 6,424,795 | B1* | 7/2002 | Takahashi | G11B 27/034 336/117 |
| 7,266,150 | B2* | 9/2007 | Demos | H04N 19/147 375/240.15 |
| 8,374,237 | B2* | 2/2013 | Demos | H04N 19/196 375/240.03 |
| 8,681,876 | B2 | 3/2014 | Rodriguez et al. | |
| 9,060,168 | B2* | 6/2015 | Tourapis | H04N 19/597 |
| 9,113,846 | B2* | 8/2015 | Zinaty | A61B 1/041 |
| 9,407,935 | B2 | 8/2016 | Rodriguez et al. | |
| 9,554,132 | B2 | 1/2017 | Crenshaw et al. | |

(Continued)

*Primary Examiner* — Tsion B Owens
(74) *Attorney, Agent, or Firm* — Polsinelli PC

(57) ABSTRACT

Provided are systems, methods, and computer-readable media for encoding, transmitting and decoding content having high fidelity and high motion content. In one aspect, a device includes at least one processor and at least memory having computer-readable instructions, which when executed by the at least one processor, cause the at least one processor to receive an encoded frame; determine whether the encoded frame includes at least one region having high fidelity content; and upon determining that the encoded frame includes at least one region having high fidelity content, perform a first decoding process for decoding the at least one region having high fidelity content, display a previous version of the high fidelity content on a display while the first decoding process is being performed, and display a decoded version of the at least one region having the high fidelity content on the display when performing the first decoding process is complete.

20 Claims, 5 Drawing Sheets

(56) References Cited

U.S. PATENT DOCUMENTS

| | | | |
|---|---|---|---|
| 2010/0027667 A1* | 2/2010 | Samuelsson | G06T 7/20 375/240.16 |
| 2011/0222837 A1* | 9/2011 | Walton | H04N 5/783 386/347 |
| 2012/0207386 A1 | 8/2012 | Ofek et al. | |
| 2016/0134882 A1* | 5/2016 | Davies | H04N 19/44 375/240.12 |
| 2017/0070743 A1 | 3/2017 | Zhou | |

* cited by examiner

ENCODING, TRANSMISSION AND DECODING OF COMBINED HIGH MOTION AND HIGH FIDELITY CONTENT

TECHNICAL FIELD

The present technology pertains to providing a mixed frame coding scheme where high fidelity and high motion content are encoded differently for transmission over a single channel and decoded different for displaying at one or more receiving devices.

BACKGROUND

Successive generations of compression schemes have increased the efficiency of video compression, particularly for camera-origin video with small differences between adjacent frames. However, detailed content with sharp edges (such as text) requires many high-frequency components to represent the content with high fidelity. Even under the most recent compression schemes a large number of bits are required to provide an accurate and satisfactory representation of the detailed content at a receiving device.

Bidirectional communication requires low-bitrate and low-latency coding. For a fixed bitrate, an encoder can either (1) spend more bits per frame on fewer frames per second, for high fidelity content that is desired to look sharp (e.g., text such as web pages, documents, spreadsheets, etc.), or (2) spend fewer bits per frame on more frames per second for high motion content (e.g., content for which motion representation takes priority over detail and sharpness such as camera-origin video, or highly animated graphics).

A combination of high fidelity and high motion content is typically communicated in a conferencing session between two or more users (e.g., an online video conferencing session, where high fidelity content (e.g. a PDF document) is presented simultaneously with a video collaboration window present on the screen presenting one or more of the participating users in the conference). During such conferencing, typically one channel of each of high fidelity and high motion content are transmitted, and the signaling and management of multiple channels adds complexity. The available bandwidth has to be split between the two kinds of content in a rigid way. The same problem arises in remote virtual desktop services, and conceivably in the rendering of semi-static interfaces alongside video content in any other kind of low-latency streaming service, such as broadcasting and gaming.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
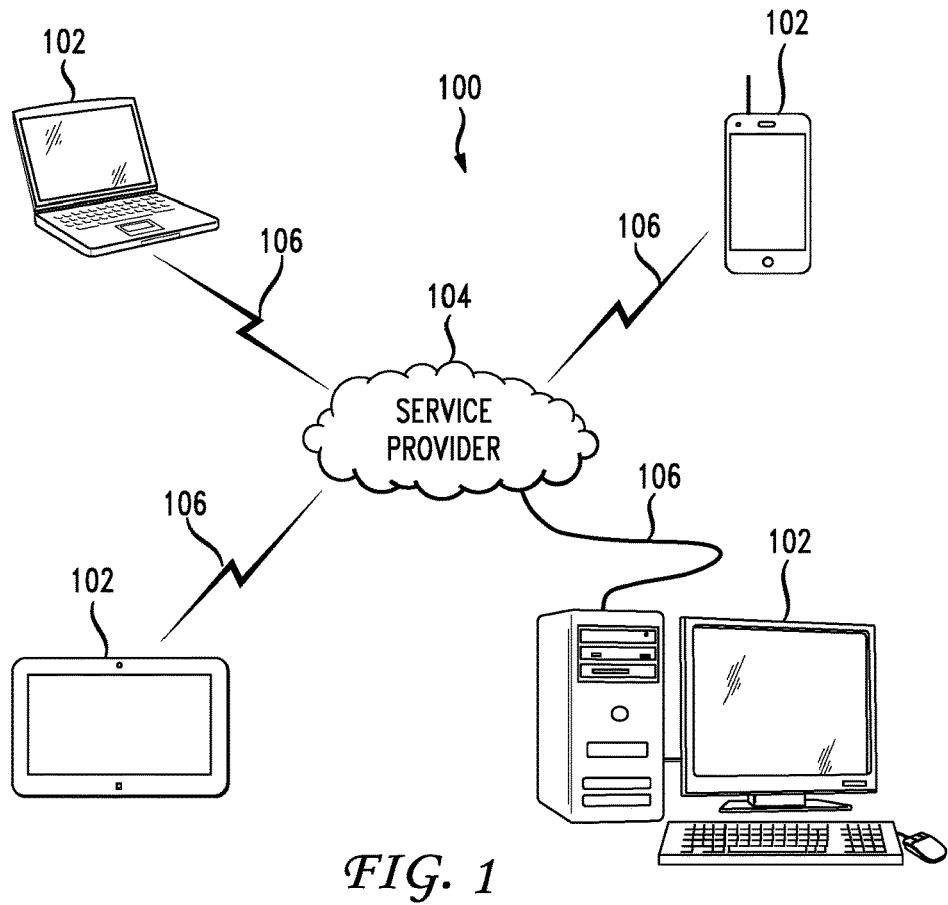
FIG. 1 illustrates a system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

1. Overview

In one aspect, a device includes at least one processor; and at least one memory having computer-readable instructions, which when executed by the at least one processor, cause the at least one processor to receive an encoded frame; determine whether the encoded frame includes at least one region having high fidelity content. Upon determining that the encoded frame includes at least one region having high fidelity content, the execution of the computer-readable instructions by the processor causes the processor to perform a first decoding process, perform a second decoding process for decoding the at least one region having high fidelity content, display a previous version of the high fidelity content on a display based on the first decoding process and while the second decoding process is being performed, and display a decoded version of the at least one region having the high fidelity content on the display then performing the second decoding process is complete.

In another aspect, a method includes receiving an encoded frame; performing a first decoding process on the encoded frame; performing a second decoding process for decoding at least one region of the encoded frame having high fidelity content; displaying a previous version of the high fidelity content on a display based on the first decoding process while the second decoding process is being performed; and displaying a decoded version of the at least one region having the high fidelity content on the display when performing the second decoding process is complete.

In another aspect, a non-transitory computer-readable medium includes computer-readable instructions, which when executed by at least one processor, cause the at least one processor to classify each region of a frame as a first-type region or a second-type region; encode the first-type region differently from the second-type region such that a different portion of the second-type region is encoded as part of a different one of the plurality of frames subsequent to the frame; transmit an encoded version of the frame to a receiving device, the receiving device decoding and displaying the first-type region while decoding and presenting a previous representation of a region corresponding to the second-type region until all of the plurality of frames subsequent to the frame are received and decoded to regenerate the second-type region.

2. Description

The present disclosure provides methods and systems related to encoding, transmission and decoding of content that include a combination of high motion and high fidelity content over a fixed rate channel (e.g. a fixed rate channel delivering content with low end-to-end latency).

FIG. 1 illustrates a system, according to an aspect of the present disclosure. As shown in FIG. 1, system 100 includes a plurality of devices 102 participating in an online collaboration such as video conferencing provided via service provider 104. Plurality of devices 102 can transmit and receive content among each other as part of the online collaboration. Plurality of devices 102 can be any one of a desktop computer, a laptop, a tablet, a mobile device, and/or any other type of device capable of establishing communication with other remote devices over the Internet and/or any other network in order to take part in an online collaboration.

Service provider 104 can be any service provider providing a combination of hardware and software tools for facilitating such an online collaboration. As example of such Service provider 104 is the WebEx service or Spark provided by Cisco Technology, Inc. of Cupertino, Calif. Service provider 104 can be a cloud based service where end users, via one or more of plurality of devices 102 log into the service, schedule an online collaboration sessions and/or join other scheduled online collaboration sessions using session specific meeting numbers, passwords, etc., assigned to a setting up/scheduling a session. Service provider 104 can also be a single-component bridge or multipoint control unit that links participants, according to any known or to be developed method. Service provider 104 can be a switch that simply passes content (media payloads) from a sending device (one of plurality of devices 102) to one or more receiving devices (one or more of plurality of devices 102). Alternatively, service provider 104 can transcode received content (e.g., received from a sending device at service provider 104) prior to sending the same to one or more receiving devices, where the transcoding includes terminating the received content at service provider 104, composing and re-encoding the received content for onward transmission to one or more receiving devices.

Plurality of devices 102 can connect to service provider 104 and/or any of the other ones of plurality of devices 102, via communication medium 106. Communication medium 106 can be any known or to be developed wired and/or wireless communication medium having a transmission bandwidth (e.g., a fixed transmission bandwidth) that enables any of plurality of devices 102 to establish a communication with service provider 104 and/or subsequently with other one(s) of plurality of devices 102 participating in an online collaboration session.

The present disclosure and examples of content encoding may be implemented at a sending device (one of plurality of devices 102), which is suitable for a switched conferencing system or can alternatively be implemented at an encoder at a transcoding bridge (e.g., at service provider 104) to simplify distribution of video to receiving device(s) (one or more of plurality of devices 102) participating in a conferencing (online collaboration) session.

Figure 2:
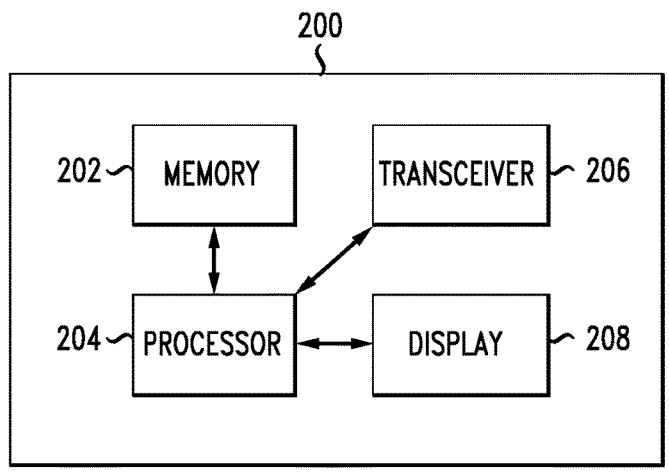
FIG. 2 illustrates components of one of plurality of devices of FIG. 1, according to an aspect of the present disclosure.

FIG. 2 illustrates components of one of plurality of devices of FIG. 1, according to an aspect of the present disclosure. As shown in FIG. 2, device 200 (which is one of plurality of devices 102 illustrated in FIG. 1) can include a memory 202, a processor 204 a transceiver 206 and a display 208. Memory 102 can include appropriate computer-readable instructions, which when executed by processor 204 carry out functionalities and tasks specific to device 200 (e.g., routine functionalities of a mobile device if device 200 is a mobile device). In addition, device 200, when participating in an online collaboration session, can function at any one time as one of a transmitter or receiver of content during the online collaboration session. Therefore, memory 202 also stores various appropriate computer-readable instructions, which when executed by processor 204 performs an appropriate task of encoding or decoding content related to the online collaboration session, which will be further described below. Transceiver 206 can be any known or to be developed transmitter/receiver for transmitting or receiving data (e.g., content for the online collaboration session or any other appropriate data as part of functioning of device 200). As can be readily appreciates, depending on the particular type of the device (a mobile phone, a laptop computer, a desktop computer, a tablet, etc.), device 200 can include other components including, but not limited to, a communication port for establishing connection over the Internet via an Ethernet cable, a microphone (for providing audio during the online collaboration session), a camera (for displaying content or the user associated with device 200 during the online collaboration session), etc. Specific functionalities implemented by processor 204 for performing encoding, transmission and decoding of content during the online collaboration session will be further described below.

Figure 3:
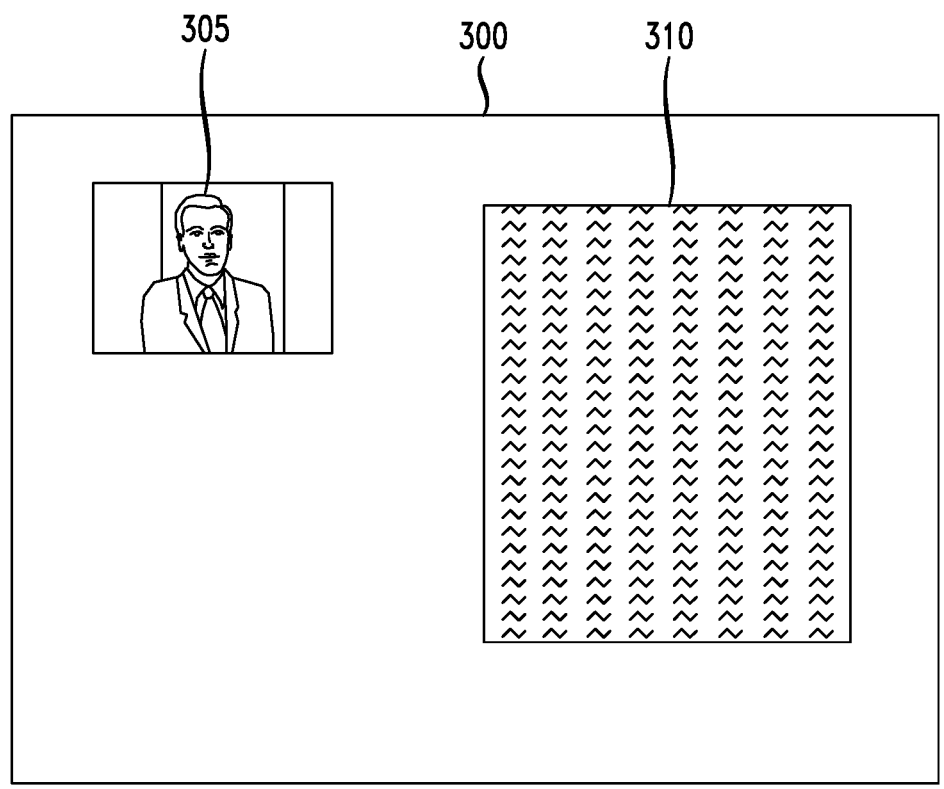
FIG. 3 illustrates an example content frame having a combination of high fidelity and high motion content, according to an aspect of the present disclosure.

FIG. 3 illustrates an example content frame having a combination of high fidelity and high motion content, according to an aspect of the present disclosure.

As shown in FIG. 3, frame 300 is an example content that includes region 305 and region 310. Frame 300 is one of a plurality of frames representing content to be encoded, transmitted and decoded as part of the online collaboration session, as will be described below. In some examples, contents are captured (sampled) at a rate of 30 frames per second or higher for natural motion. Region 305 is of a participant (user of device 200) participating in the online collaboration. While this is shown as a still image of the participant, region 305 is a representation of a video that shows the participant speaking, listening, observing content during the online collaboration session, etc., In one example, image 305 represents high motion data and may thus be referred to as high motion content region 305. Such high motion content (e.g., video) is usually accompanied by audio, and their combination delivers the interpersonal communication that is the principal function of video conferencing. For effective bi-directional communication, the latency of capture-encoding-delivery-decoding process of participant video must be as low as possible, which places constraints on the way in which such video can be encoded and sent, particularly over a low-bandwidth channel.

While camera-captured video has been described as an example of high motion content region 305, the present disclosure is not limited thereto. For example, instead of a video, high motion content region 305 can be animated content to be presented to other participants in the online collaboration session instead of and/or in combination with a video representation of the corresponding participant.

Furthermore, the example content frame 300 also includes region 310 which may also be referred to as high fidelity content region 310 described above. The reason region 310 can be referred to as high fidelity content region 310 is because fine details of the content included therein should be represented well to other participants in the online collaboration session (e.g., text, drawings and textures are to be shown sharply, and the priority is to show this detail well, rather than to render motion). There is also usually a looser requirement on latency when transmitting and displaying high fidelity content for participants at receiving devices compared to transmitting and displaying high motion content.

Such high fidelity content typically moves little or not at all, and motion and change is infrequent and discontinuous. When change does occur, it is typically radical rather than incremental—such as a change of page or slide in a presentation—and the rendering of this large change between frames requires a large number of frames, particularly if preserving the degree of sharpness previously attained for the static high fidelity content. If a large change to a whole high fidelity content region is encoded in a single frame, the large number of bits so encoded would lead to a longer latency in transmission of this frame over a fixed-bandwidth channel, including any high motion content encoded in other regions of the same frame. Such high latency can be addressed by coding the new frame with fewer bits, and thus less sharpness. However, this can lead to a variation, over time, in the quality of the high fidelity content region, which can result in a sub-optimal experience by the participants at receiving device(s).

Examples of high fidelity content region 310 include, but are not limited to, web pages, a PDF document, a spreadsheet, any text-based content, still-image based content, content with sharp edges, etc.

While content of frame 300 includes only two separate high motion content region 305 and high fidelity content region 310, the present disclosure is not limited thereto. For example, content can include multiple high motion and high fidelity content that may or may not overlap with each other.

As mentioned above, bidirectional communication (e.g., between device 200 and one or more of remaining ones of plurality of devices 102, which many be referred to as one or more receiving devices) is based on low-bitrate and low-latency coding. According to currently utilized methods, in a bidirectional communication session in which communication medium 106 has a fixed bitrate, for encoding both high motion content region 305 and high fidelity content region 310, processor 204 of device 200 can either (i) spend more bits per frame on fewer frames per second in order to ensure optimal reception of high fidelity content region 310 at the one or more receiving devices or (ii) spend fewer bits per frame on more frames per second in order to ensure optimal reception of high motion content of region 305 at one or more receiving devices. Encoding high fidelity content region 310 with more bits will result in a longer time period for transmission and reception of high fidelity content of region 310 at the one or more receiving devices, which would in turn delay a smooth rendition of changes in high fidelity content (e.g., a turn from one page of a PDF document to a next page) at the one or more receiving devices during the online collaboration session.

Also as mentioned in the Background section, in a video conferencing scenario, typically one channel of each of high fidelity and high motion content are transmitted, where the signaling and management of multiple channels adds complexity. One advantage of examples of the present disclosure is the combining of the high fidelity and high motion content into a single stream encoded at a sending device, which enables multiple participants to easily contribute presentation-style content simultaneously over their principal video channel, avoiding the complexity of negotiation of multiple presentation channels, since conventional protocols (such as BFCP) support one presenter at a time. Furthermore, examples described herein allow any participant to contribute high fidelity content at any time.

Hereinafter, examples will be described of a method for encoding, transmitting and decoding of a combined high fidelity and high motion content that addresses the issue of lack of accurate rendition of high fidelity content while preserving smooth representation of high motion content at the one or more receiving devices in an online collaboration session. According to examples described herein, two types of content with opposite characteristics (high motion content and high fidelity content) can be delivered in a single bitstream at low bitrates within constraints on latency (which implies limits to maximum coded frame size). Furthermore, the overall bandwidth of a channel does not need to be partitioned between (i) and (ii) described above for high motion and high fidelity channels. Instead, a single call can be made with a variable ratio of both high motion and high fidelity content, formed into a single stream. Furthermore, where a single video-stream only is supported, higher fidelity rendition of infrequently updated text-based or detailed content (high fidelity content) can be delivered alongside higher frame rate content.

Hereinafter, content such as that of frame 300 that includes both high motion and high fidelity content may also be referred to as combined high motion and high fidelity content.

Figure 4:
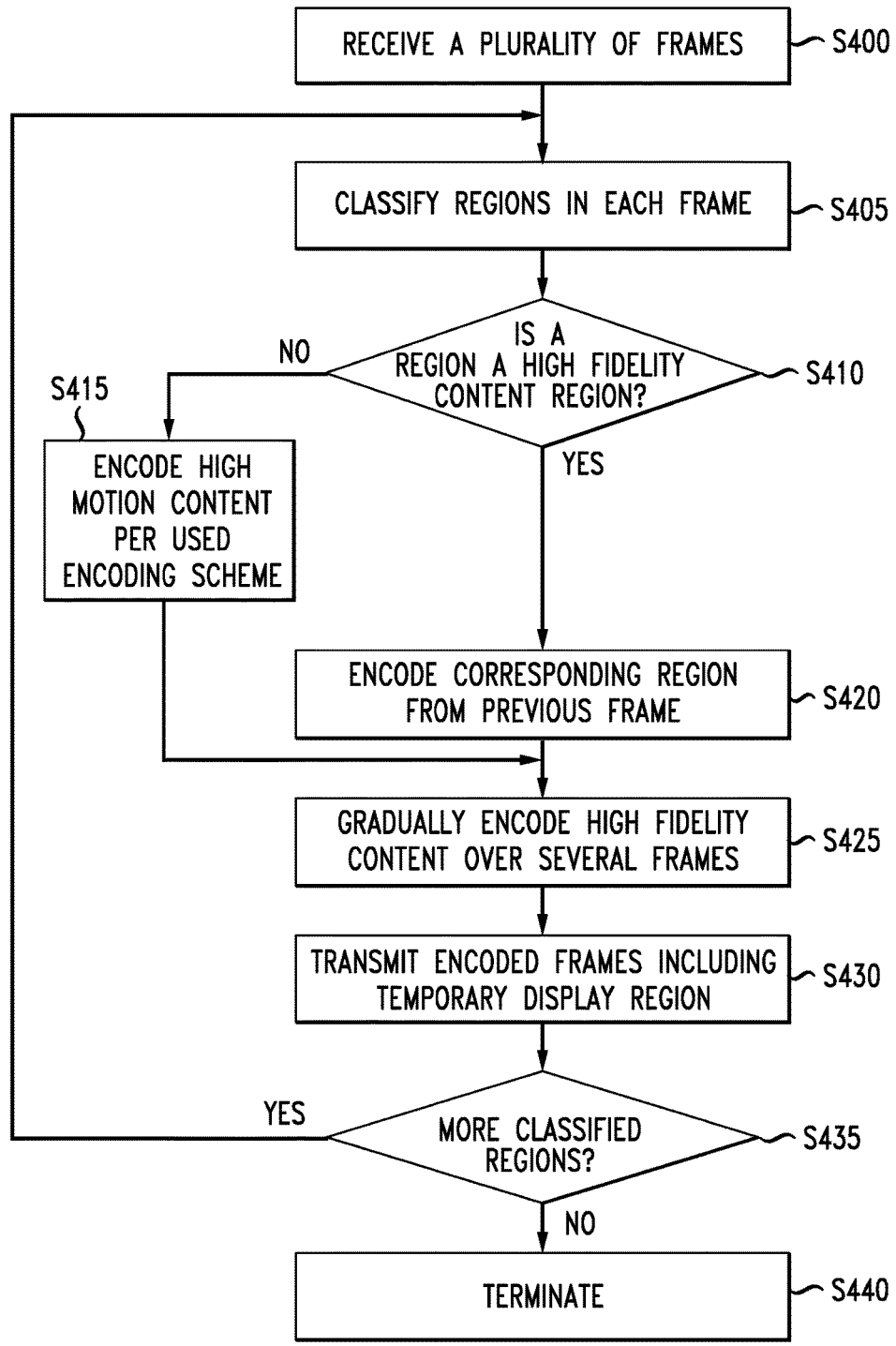
FIG. 4 illustrates an encoding method of combined high motion and high fidelity content, according to an aspect of the present disclosure.

FIG. 4 illustrates an encoding method of combined high motion and high fidelity content, according to an aspect of the present disclosure. FIG. 4 will be described from the perspective of processor 204 (executing computer-readable instructions stored in memory 202 that transform processor 204 into a special purpose processor for encoding frames of combined high motion and high fidelity content) while assuming device 200 is a device participating in the online collaboration session and is acting as a transmitter of content at a given point of time during the online collaboration session.

At S400, processor 204 receives a plurality of frames such as frame 300 of FIG. 3 of combined high motion and high fidelity content to be encoded for transmission to one or more receiving devices participating in an online collaboration session (e.g., a video conferencing session). The plurality of frames include designated frames I(n−1), I(n), . . . I(n+m), where n and m are integers equal to or greater than 1. As will be described below, frame I(n+m) is a frame at which progressive encoding of high fidelity region of frame I(n) is completed. In one example, the plurality of frames are samples of material being presented via device 200 to other ones of plurality of devices 102 that are participating in the online collaboration session. In one example, high motion content of the material can be sampled at higher rates compared to high fidelity content of the material because the motion (changes) of high motion content are more important than visual details thereof compared to high fidelity content of the material.

It should be noted that the frame at which a high fidelity content region is sampled may or may not be the same as a frame in which the high fidelity content region changes (e.g., a change from a first page to a second page of the same PDF document).

As an example (assuming n=55 and m=8), if a high fidelity content region described below is sampled at I(n−m−1) and I(n) frames, and the page change of the PDF document occurs at frame I(n−2), the change would start to be encoded when I(n) is sampled, and would become visible at the decoded frame corresponding to I(n+m).

In describing FIG. 4, an assumption is made that frame I(n) (which is an example shown in FIG. 6 and described with reference thereto below) is the frame at which processor 204 samples high fidelity content region.

For each received frame (e.g., frame I(n)), at S405, processor 204 classifies each region thereof as either a region with high motion content such as high motion content of region 305 of frame 300 (first-type region) and/or a region with high fidelity content such as high fidelity content of region 310 of frame 300 (second-type region). In one example, processor 204 performs the classification at S405 based on any know or to be developed contrast and spectral analyses, where regions which are relatively static and have content with fine detail, high contrast and sharp edges are classified as high fidelity content while regions which are less static are classified as high motion content. An appropriate threshold for determining whether a region is static or not depends on specifics of the utilized contrast/spectral analysis, as known in the art.

At S410 and going through each identified region of a frame, process 204 determines whether a region is classified as one having high fidelity content. If at S410, processor 204 determines that a region is not classified as one having high fidelity content (e.g., is a first-type region having high motion content), then at S415, processor 204 encodes the high motion content according to a compression scheme or standard (e.g., H/264, H.265, VP8/9, etc.) used for encoding frames by processor 204. The encoded high motion content is then transmitted to one or more receiving devices at S425 (as will be described below) as part of an encoded frame at normal intervals (e.g., 30 frames per second). Accordingly, high motion content is transmitted to the receiving device(s) with low latency (e.g., in order to present an updated rendition of high motion content). The compression scheme/standard may be any known, or to be developed, compression scheme/standard.

Referring back to S410, if processor 204 determines that the region of frame I(n) is a region with high fidelity content, then processor 204 encodes the high fidelity content region (second-type region) differently from the high motion content region described at S415, as will be described below.

At S420, processor 204 encodes a region in a previous frame (e.g., I(n−1)) corresponding to the high fidelity content region.

At S425, if the current frame is a frame at which a new sample of high fidelity content region is obtained, processor 204 gradually encodes the high fidelity content region over the plurality of frames I(n) to I(n+m) such that the encoded frame I(n) to I(n+m), when transmitted, together cover all portions of the encoded high fidelity content region that is sampled at frame I(n). In other words, processor 204 gradually encodes the high fidelity content region over one or more subsequent ones of the plurality of frames (e.g., over frames I(n) to I(n+k), where k is a positive integer having a value between 1 and m and represents a number of frames over which all portions of the high fidelity content region can be encoded and transmitted to one or more receiving devices). During this succession of encoded frames that jointly convey the high fidelity content region, the high fidelity content of this region is sampled at a single point in the input sequence (e.g., at frame I(n)). At the completion of the plurality of encoded frames corresponding to I(n) to I(n+m), the entirety of the content of the high fidelity content region at the time of I(n) has been transmitted to one or more receiving device(s). In encoding frames subsequent to I(n+m), the high fidelity content region can be resampled, to represent any changes, including motion such as scrolling of a page, or motion of a pointer, of that content, and recommence its progressive encoding over a subsequent plurality of encoded frames.

Still at S425, if the current frame is not a frame at which a new sample of high fidelity content region is obtained e.g., its frame I(n+1), processor 204 continues the gradual encoding of the previous sample of high fidelity content region (sampled at frame I(m−n−1)).

At S425 and as part of gradual encoding of the region with high fidelity content, processor 204 performs a spatial encoding of the high fidelity content region where a different portion of high fidelity content of region 310, is encoded in each of encoded frames I(n) to I(n+m). In other words, processor 204 splits (divides) high fidelity content region 310 into a plurality of portions and encodes a different one of the plurality of portions (e.g., sequentially from the first portion to the last portion) in one of the encoded frames I(n) to I(n+m). This allows each dispatched frame to remain constant in size, and to reach its destination over a low bandwidth (fixed bitrate) connection with low latency, and thus to convey the high fidelity content region well, alongside the high motion content region. The parts of the high fidelity content region that are not yet updated in a specific one of frames I(n) to I(n+m) are simply copies of earlier content for that region from the previous frame, and at frame I(n+m), parts of the region that were updated in preceding frames are simply copies of the preceding (post-update) frame.

In one example, processor 204 encodes the high fidelity content region in frames I(n) to I(n+1) as a slice (or similar) structure within the coded frame I(n) to I(n+m), referencing a set of parameters (e.g. quantization regime and matrices, deblocking and pre-display filter options) and coding tools that differ from those applied in the high motion content region of frames I(n) to I(n+m).

At S430, processor 204 transmits each encoded frame (e.g., encoded frame 300) to one or more receiving devices (e.g., via transceiver 206 and communication medium 106) participating in the online collaboration session. Each encoded frame transmitted at S430 includes an encoded version of any high motion content region(s) of the corresponding frame encoded at S415 together with any gradually encoded high fidelity content region(s) at regular intervals (e.g, at a rate of 30 frames per second). Furthermore, at each frame I(n) to I(n+m−1) of a gradually encoded high fidelity content region, processor 204 also transmits a low-cost encoded version (typically a static replication) of the region in a previous frame (e.g., frame R(n−1), corresponding to a prior version of high fidelity content region 310), for display purposes during gradual decoding of high fidelity content region 310 at one or more receiving devices, as will be described below with reference to FIG. 5. This low-cost encoded region may be referred to as a temporary display region. This low-cost encoded temporary display region represents a static version of the high fidelity content region in frame R(n−1) that corresponds to the high fidelity content region in an earlier frame in the input sequence, and is displayed during the progressive decoding of that region over frames I(n) to I(n+k).

Figure 6:
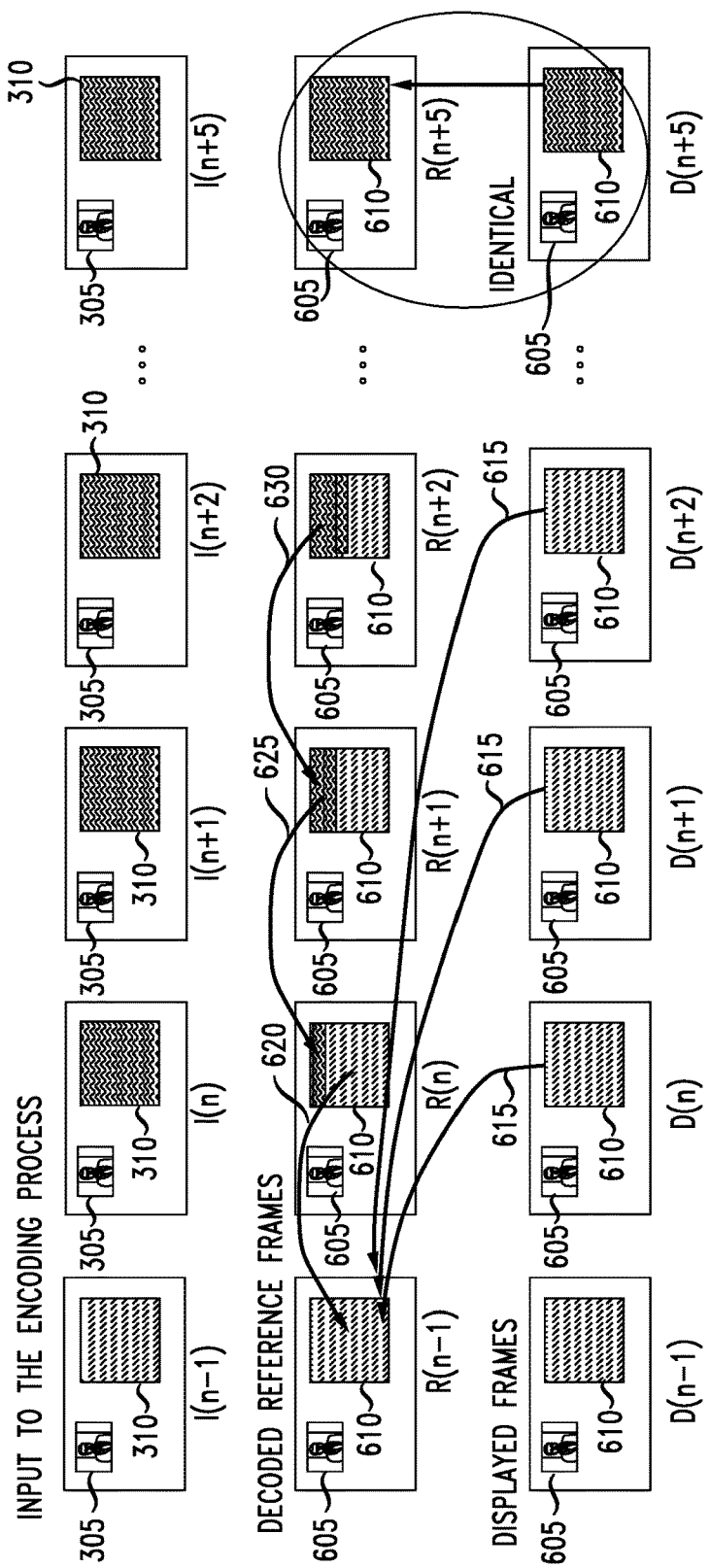
FIG. 6 illustrates an example of the encoding and decoding processes of FIGS. 4 and 5, according to an aspect of the present disclosure.

One example of the process at steps S400 to S430 would be as follows. Processor 204 encodes all high motion content regions of frame I(n) using known encoding methods (e.g., H.264, H.265, VP8/9, etc.) for 30 frames-per-second coding. For high fidelity content region(s) in frame I(n), processor 204 freezes the input of each high fidelity content region, and code it as an exact copy of the corresponding region in frame R(n−1), which results in very few bits being used for this encoding. Each high fidelity content region is then sampled at the time of frame I(n) and (i) is encoded with allocation of bitrate and choice of encoding parameters to preserve sharpness and high fidelity of the content and (ii) is transmitted over multiple subsequent frames I(n) to I(n+k). Thereafter, at each receiving device, each such frame is decoded to a reference frame R(n) to R(n+k) which incorporates an incremental update to the progressively (gradually) encoded portion of the high fidelity content region. During the period covering frames n to n+k, during which the high fidelity content region is being progressively updated, a previous version of the high fidelity content region obtained from frame R(n−1) is displayed as part of displayed frames D(n) to D(n+k−1). The decoded high fidelity content region is only displayed when all portions thereof are decoded, at which point the final decoded reference frame R(n+m) is displayed as D(n+m), as shown in FIG. 6, changing the view of the contents of the high fidelity content region from that corresponding to frame I(n−1) to of the one corresponding to frame I(n).

Thereafter, at S435, processor 204 determines whether frame I(n) has more classified regions to be encoded. If processor 204 determines that no more regions are left to be encoded, then at S440, processor 204 terminates the method.

Otherwise, the process reverts back to S405 and processor 204 repeats S405-S440 again.

In one example and instead of sequentially performing the process of FIG. 4 for all the classified regions, the encoding of all classified regions can be performed in parallel.

Having described the encoding and transmission processes of content by processor 204 of device 200 when device 200 has content to be transmitted as part of the online collaboration session, we now turn to the description of decoding the transmitted content at a receiving one of plurality of devices 102 that participates in the online collaboration session 102. As mentioned above, each device participating in the online collaborations session can act as both a sending device and a receiving device. Therefore, FIG. 5, which describes the decoding process, is also described from the perspective of processor 204 assuming that device 200 now functions as a receiving device that receives encoded content from one or more of other devices participating in the online collaborations session.

Figure 5:
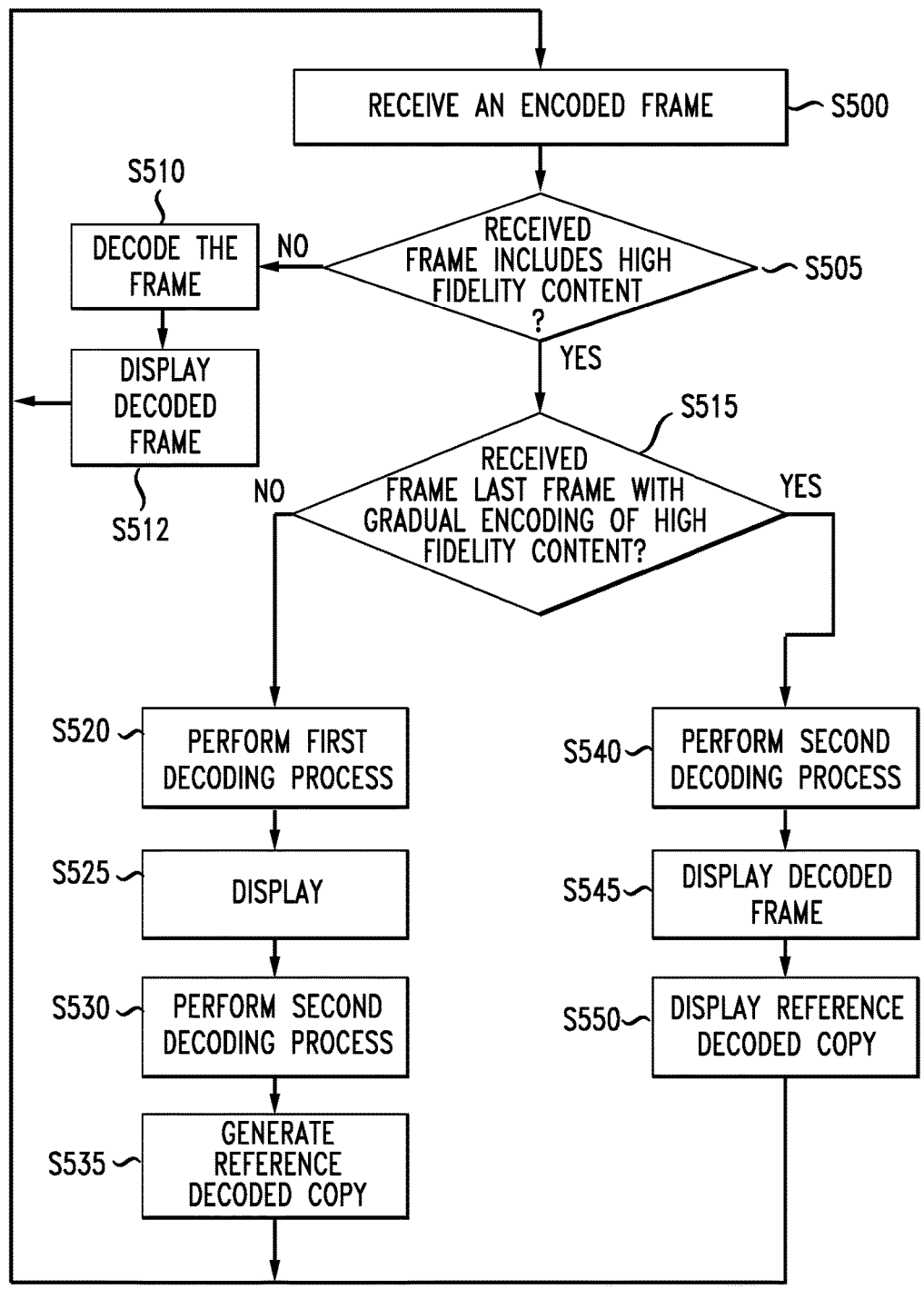
FIG. 5 illustrates a decoding method of combined high motion and high fidelity content, according to an aspect of the present disclosure.

FIG. 5 illustrates a decoding method of combined high motion and high fidelity content, according to an aspect of the present disclosure. For purposes of describing FIG. 5, it is assumed that the frame with at least one region having high fidelity content that is gradually encoded is frame I(n) described above and that the gradual encoding is over frames I(n), . . . , I(n+m).

At S500 and at regular intervals, processor 204 receives one of a plurality of encoded frames (e.g., frames I(n−1), . . . , I(n+m) described above with reference to FIG. 4). In one example, the encoded frames are received at device 200 at regular intervals corresponding to regular intervals according to which encoded frames are transmitted by a transmitting device, as described above with reference to FIG. 4.

At S505, processor 204 determines if a received frame includes at least one encoded region having high fidelity content. If processor 204 determines that the received frame does not include any encoded high fidelity content regions, processor 204 performs, at S510, a decoding of high motion content of the received frame and subsequently at S512, displays the decoded frame on display 208 of device 200. Processor 204 performs the decoding and displaying of high motion content of each frame according to any known or to be developed decoding methods, the instructions for which are stored on memory 202 and executed by processor 204. Thereafter, the process reverts back to S500.

However, if at S505, processor 204 determines that a received frame includes at least one encoded region having high fidelity content (in addition to or instead of high motion content regions), then at S515, processor 204 determines if the frame is the last frame that includes a partial encoding of the at least one encoded region having high fidelity content as described above. In other words, at S515, processor 204 determines if the received frame is frame I(n+m) with frames I(n) to I(n+m) each including a partial encoding of the least one encoded region having high fidelity content, as described above.

If at S515, processor 204 determines that the received frame is not the last frame that includes a partial encoding of the at least one encoded region, then at S520, processor 204 performs a first decoding process as follows. The first decoding process may also be referred as a concealment decoding process.

As part of performing the first decoding process, processor 204 decodes any high motion content region(s) included in the received encoded frame, per that described above with reference to S505. In addition, processor 204 uses a low-cost version of a portion of a previously decoded frame that corresponds to the high fidelity content (e.g., 610 of decoded frame R(n−1)), which will be further described with reference to FIG. 6 below). Thereafter, at S525, processor 204 displays the frame decoded at S520 as frame D(n+k), which will be further described below with reference to FIG. 6. In other words, frame D(n+k) as displayed includes decoded high motion content of the corresponding received encoded frame as well as a decoded low-cost version of a portion of a previous frame R(n−1) that corresponds to the high fidelity content of the at least one region.

After performing S520 and S525 or in parallel with performing S520 and S525, processor 204 performs a second decoding process at S530, which may also be referred to as a gradual decoding process of high fidelity content of the at least one region. Processor 204 performs the second decoding process over a plurality of encoded frames received at the device subsequent to reception of the encoded frame (e.g., over frames corresponding to I(n) to I(n+m−1), as received at device). The encoded frame and each of the plurality of encoded frames include an encoded version of a different portion of the at least one region having the high fidelity content. This will be further described below In one example, as part of the second decoding process, processor 204 creates a series of reference decoded copies of the high fidelity content region (e.g., R(n), R(n+1), R(n+2), . . . to R(n+m), which will be further described with reference to FIG. 6). Each reference decoded copy includes a decoded version of any high motion content region included in the received encoded frame as well as a representation of the at least one region having the high fidelity content.

Each time one of encoded frames corresponding to I(n+k) is received (with k being an integer in the range 0 to m−1), processor 204 decodes the high motion content included therein and a portion of the high fidelity content region encoded therein (as described with reference to FIG. 4 above). This may be referred to as a decoded portion. Thereafter, at S535, processor 204 generates a corresponding one of the series of reference decoded copies (e.g., R(n+k) which can be any one of R(n) to R(n+m−1)) by replacing (updating) a portion of the representation corresponding to the decoded portion with the decoded portion. This will be further described with reference to the example shown in FIG. 6. Thereafter, the process reverts back to S500.

Referring back to S515, if at S515, processor 204 determines that the received frame is the last of the gradually encoded frames that includes a partial encoding of the at least one encoded region having high fidelity content (e.g., if processor 204 determines that the received frame is frame I(n+m)), then at S540, performs the second decoding process of I(n+m) in the same manner as described above with reference to S530. Thereafter, at S545, processor 204 generates a corresponding reference decoded copy (e.g., R(n+m)) in the same manner as described above with reference to S535.

Thereafter, at S550, processor 204 displays the reference decoded copy of S545 (e.g., R(n+m)) as D(n+m) on display 208. In other words, the high fidelity content portion of each frame displayed on display 208 remains the same as D(n−1) during the decoding process of each of frames I(n) to I(n+m−1) until processor 204 decodes high fidelity content portion of frame I(n+m), generates the reference frame R(n+m) and then displays the same as D(n+m). Thereafter, the process reverts back to S500.

FIG. 6 illustrates an example of the encoding and decoding processes of FIGS. 4 and 5, according to an aspect of the present disclosure. In describing FIG. 6, an assumption is made that m=5 and that each frame includes high motion content region 305 and high fidelity content region 310.

As shown in FIG. 6, a series of frames I(n−1) to I(n+5), each of which includes high motion content 305 and high fidelity content 310, are encoded according to the process of FIG. 4. As shown in FIG. 6, the high fidelity content of region 310, changes in frame I(n) relative to frame I(n−1). For example, a non-limiting case of high fidelity content of region 310 in frame I(n−1) is a first page of a PDF document that changes to page 2 of the same PDF document in frame I(n).

As mentioned above, high fidelity content regions do not change, from frame to frame, as regularly as high motion content, having periods of stability, or if they do change regularly, it is reasonable to represent the sequence with a subsampling of the totality of frames. For example, high fidelity content region may be represented by updating only every $(m+1)^{th}$ frame. Accordingly, high fidelity content regions are sampled less frequently (e.g., at frame I(n) in this example). However, the frame at which a high fidelity content region is sampled may or may not be the same as a frame in which the high fidelity content region changes (e.g., a change from a first page to a second page of the same PDF document).

As an example, if a high fidelity content region is sampled at I(m−n−1) and I(n) frames, and the page change of the PDF document occurs at frame I(n−2), the change would start to be encoded when I(n) is sampled, and would become visible at the decoded frame corresponding to I(n+m).

The results of the two decoding processes of FIG. 5 are illustrated in FIG. 6. In performing the first decoding process at S520, processor 204 creates displayed frames D(n−1) to D(n+5) corresponding to encoded frames I(n−1) to I(n+5). As shown in FIG. 6, each of the displayed frames D(n−1) to D(n+5) includes decoded high motion content 605 corresponding to high motion content regions 305 of frames I(n−1) to I(n+5). Furthermore, each of the displayed frames D(n−1) to D(n+4) only displays a decoded version of high fidelity content region 310 from frame R(n−1), designated as decoded high fidelity content region 610 (e.g., continues to display page 1 of the PDF document despite the fact that page 1 of the PDF document was changed to page 2 thereof at a transmitting device in frame I(n)). This is shown by arrow 615 in FIG. 6. In other words, while the high fidelity content of region 310 changes in frame I(n) relative to frame I(n−1), the same change is not reflected in decoded high fidelity content region 610 displayed in frames D(n) to D(n+4). This continuous decoding and displaying of high fidelity content region of R(n−1) in displayed frames D(n) to D(n+4) is based on decoding of low-cost display image of high fidelity content region 610 of frame R(n−1).

Furthermore, FIG. 6 illustrates the second decoding process of S515, in which a series of decoded reference frames R(n−1) to R(n+5) are created by processor 204. As shown by arrows 620, 625 and 630, in each gradual decoding of frames I(n) to I(n+5) that result in decoded reference frames R(n) to R(n+5), a portion of high fidelity content region 610 of R(n−1) (e.g., a decoded version of page 1 of the PDF document described above) is gradually replaced with a portion of high fidelity content region of frame I(n) (e.g., page 2 of the PDF document) until frame R(n+5), in which all of the high fidelity content region of R(n−1) is replaced with a decoded version of high fidelity content region of frame I(n) (e.g., all of page 1 of the PDF document is replaced with a completely decoded version of page 2 thereof). At this point and as shown in FIG. 6, decoded reference frame R(n+5) is displayed on display 208 and R(n+5) and D(n+5) are identical.

According to this process, a user at a receiving device (device 200) in an online collaboration session experiences the following.

The user continues to receive, via a display of a corresponding one of plurality of devices 102 (e.g., display 208 of device 200), high motion data corresponding to, for example, the speaker at a transmitting device. During a period of time when frames I(n) to I(n+5) that include updated high fidelity content (for example, page 2 of a PDF document) are encoded, transmitted and decoded, the user at device 200 continues to have high fidelity content of frame I(n−1) (for example, page 1 of the PDF document) displayed on display 208, while in the background, processor 204 continues to receive and decode gradual versions of high fidelity content region of frame I(n) (e.g., page 2 of the PDF document). Once all the frames corresponding to high fidelity content region of frame I(n) are received and decoded at device 200, processor 204 then updates the next display frame (e.g., D(n+5)) to display high fidelity content region of frame I(n) (e.g., page 2 of the PDF document).

The gradual decoding process described with reference to S515, an example of which is also described with reference to FIG. 6 may be considered a spatial decoding of high fidelity content region, where at each step, a portion of decoded high fidelity content region of frame I(n−1) is replaced with a corresponding portion of high fidelity content region of frame I(n) decoded as part of the gradual second decoding process.

In another example, instead of such spatial decoding, processor 204 performs an alternate decoding process in which the visual quality of high fidelity content region of I(n) is progressively (gradually) improved by the decoding of each transmitted frame I(n) to I(n+m). In each of frames R(n) to R(n+m) the entirety of the high fidelity content region captured at I(n), rather than a specific portion, is encoded but with progressively improved quality in each frame, such that the total number of bits required to update the region to the desired quality is distributed across the encoded frames I(n) to I(n+m). In order to display only the high fidelity content region with the desired sharpness, the region is only displayed when the update process has completed. Accordingly, processor 204 generates one series of decoded frames (e.g., display frames D(n) to D(n+5)) by again displaying a version of the high fidelity content region that is an exact copy of the region as displayed at frame D(n−1). Once the update of the high fidelity content region is complete at frame R(n+m), the displayed version of the frame D(n+m) will be the same as frame R(n+m), and the decoded version of the high fidelity content region corresponding to I(n) is visible.

In block-based (frame-based) hybrid video codecs (e.g. H.264, H.265, VP8/9, etc.) a coded set of blocks (frames) have a minimum granularity with respect to picture/frame boundaries. The high fidelity content regions will often not align to the natural boundary between blocks (frames). The high fidelity content region, the content of which is being updated gradually over frames R(n) to R(n+m), is maintained in the displayed frames D(n) to D(n+m−1) as a copy of the region decoded and displayed at an earlier time. This temporarily displayed version of the high fidelity content region may be considered as a "patch" that conceals the update in progress. The displayed "patch" can be copied from a retained reference frame (e.g., high fidelity content region of frame R(n−1) or the same region in another earlier decoded frame). The patch may be specified with sub-pixel precision in order to match the boundaries of the high fidelity content region of frame I(n), and the boundary of the patch can have any desired geometrical specification. The displaying of updated high fidelity content region at or beyond the final update frame D(n+m) is effected simply by no longer displaying the concealing "patch".

Furthermore, in some examples, a high fidelity content region can have motion associated therewith (e.g., the entire high fidelity content region may be moving as a whole within the boundary of the encoded frame). If processor 204 determines that a region of a frame has a moving high fidelity content region, then processor 204 can either (i) suspend the separate treatment of the region as high fidelity content region such that the high fidelity content region is treated (encoded and decoded) in the same manner as a high motion content region described above, since its optimum sharpness is of less value, or (ii) deduce the motion of the high fidelity content region relative to its location in previous frames, and use motion compensation to obtain the content copied from frame R(n−1) to be displayed during the progressive encoding process, while inserting the content of the region captured at frame I(n) at the appropriate location in frame I(n+k). If the dimensions or boundary of the high fidelity content region are not constant from frame to frame, then i) must be used.

For clarity of explanation, in some instances the present technology may be presented as including individual functional blocks including functional blocks comprising devices, device components, steps or routines in a method embodied in software, or combinations of hardware and software.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

I claim:

1. A device comprising:
at least one processor; and
at least one memory having computer-readable instructions, which when executed by the at least one processor, cause the at least one processor to:
  receive an encoded frame;
  determine whether the encoded frame includes at least one region having high fidelity content; and
  upon determining that the encoded frame includes at least one region having high fidelity content,
    perform a first decoding process,
    perform a second decoding process for decoding the at least one region having high fidelity content,
    display a previous version of the high fidelity content on a display based on the first decoding process and while the second decoding process is being performed, and
    display a decoded version of the at least one region having the high fidelity content on the display when performing the second decoding process is complete.

2. The device of claim 1, wherein the execution of the computer-readable instructions causes the at least one processor to perform the second decoding process over a plurality of encoded frames received at the device subsequent to reception of the encoded frame, the encoded frame and each of the plurality of encoded frames including an encoded version of a different portion of the at least one region having the high fidelity content.

3. The device of claim 2, wherein the execution of the computer-readable instructions causes the at least one processor to perform the second decoding process by creating one or more reference decoded copies, the one or more reference decoded copies including a decoded version of any high motion content region included in the received encoded frame as well as a representation of the at least one region having the high fidelity content.

4. The device of claim 3, wherein the execution of the computer-readable instructions causes the at least one processor to create each of the one or more reference decoded copies by:
  decoding an encoded version of a portion of the high fidelity content included in the received encoded frame to yield a decoded portion; and updating the representation of the at least one region by replacing a portion of the representation corresponding to the decoded portion with the decoded portion.

5. The device of claim 4, wherein the execution of the computer-readable instructions causes the at least one processor to repeat the decoding and the updating until all of the plurality of encoded frames that include all the different portions of the at least one region having the high fidelity content are decoded as part of the second decoding process.

6. The device of claim 2, wherein the execution of the computer-readable instructions causes the at least one processor to,
prior to performing the first decoding process, determine if the encoded frame is the last one of the plurality of encoded frames; and
upon determining that the encoded frame is the last one of the plurality of encoded frames, skip performing the first decoding process.

7. The device of claim 1, wherein the execution of the computer-readable instructions causes the at least one processor to perform the first decoding process by:
decoding any high motion content included in the received encoded frame;
obtaining the previous version of the high fidelity content; and
displaying a decoded version of any high motion content of the received encoded frame together with the previous version of the high fidelity content until the processor completes the second decoding process.

8. The device of claim 2, wherein
the second decoding process is a gradual improvement of a quality of the at least one region over the plurality of encoded frames received subsequent to the reception of the encoded frame, wherein the gradual improvement is based on each of the different portions of the high fidelity content included in each of the plurality of encoded frames received subsequent to the encoded frame, and
the previous version of the high motion content is a patch superimposed on a region corresponding to the high fidelity content as the processor performs the second decoding process in order to prevent the gradual improvement from being visible on the display.

9. The device of claim 8, wherein the execution of the computer-readable instructions causes the at least one processor to remove the patch upon completion of the first decoding process to display the decoded version of the high fidelity content in the at least one region.

10. A method comprising:
receiving an encoded frame;
performing a first decoding process on the encoded frame;
performing a second decoding process for decoding at least one region of the encoded frame having high fidelity content;
displaying a previous version of the high fidelity content on a display based on the first decoding process while the second decoding process is being performed; and
displaying a decoded version of the at least one region having the high fidelity content on the display when performing the second decoding process is complete.

11. The method of claim 10, wherein the first decoding process is performed over a plurality of encoded frames received at the device subsequent to reception of the encoded frame, the encoded frame and each of the plurality of encoded frames including an encoded version of a different portion of the at least one region having the high fidelity content.

12. The method of claim 11, wherein the performing the second decoding process comprises creating one or more reference decoded copies, the one or more reference decoded copies including a decoded version of any high motion content region included in the received encoded frame as well as a representation of the at least one region having the high fidelity content.

13. The method of claim 12, wherein the creating each of the one or more reference decoded copies comprises:
decoding an encoded version of a portion of the high fidelity content included in the received encoded frame to yield a decoded portion; and
updating the representation of the at least one region by replacing a portion of the representation corresponding to the decoded portion with the decoded portion.

14. The method of claim 13, further comprising:
repeating the decoding and the updating until all of the plurality of encoded frames that include all the different portions of the at least one region having the high fidelity content are decoded as part of the second decoding process.

15. The method of claim 10, wherein the first decoding process comprises:
decoding any high motion content included in the received encoded frame; and
obtaining the previous version of the high fidelity content; and
displaying a decoded version of any high motion content of the received encoded frame together with the previous version of the high fidelity content until the processor completes the second decoding process.

16. A non-transitory computer-readable medium comprising computer-readable instructions, which when executed by at least one processor, cause the at least one processor to:
classify each region of a frame as a first-type region or a second-type region;
encode the first-type region differently from the second-type region such that a different portion of the second-type region is encoded as part of a different one of the plurality of frames subsequent to the frame; and
transmit an encoded version of the frame to a receiving device, the receiving device decoding and displaying the first-type region while decoding and presenting a previous representation of a region corresponding to the second-type region until all of the plurality of frames subsequent to the frame are received and decoded to regenerate the second-type region.

17. The non-transitory computer-readable medium of claim 16, wherein the first-type region is a high motion content region and the second-type region is a high fidelity content region.

18. The non-transitory computer-readable medium of claim 16, wherein the execution of the computer-readable instructions by the at least one processor cause the at least one processor to encode the second-type region gradually over the plurality of frames subsequent to the frame such that the encoded frame and the encoded plurality of frames together cover all portions of the second-type region.

19. The non-transitory computer-readable medium of claim 16, wherein the execution of the computer-readable instructions by the at least one processor cause the at least one processor to perform the function of dividing the second-type region into the plurality of portions, wherein a number of the plurality of frames subsequent to the frame is equal to a number of the plurality of portions.

20. The non-transitory computer-readable medium of claim 16, wherein the execution of the computer-readable instructions by the at least one processor cause the at least one processor to perform the functions of:
  determining whether a region of the frame is a combination of the first-type region and the second-type region; and
  terminating the method upon determining that the region of the frame is the, combination of the first-type region and the second-type region.

* * * * *